United States Patent
Okamura et al.

(10) Patent No.: US 9,316,317 B2
(45) Date of Patent: Apr. 19, 2016

(54) SEALING APPARATUS

(75) Inventors: Kei Okamura, Kariya (JP); Yoshitake Hisada, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 713 days.

(21) Appl. No.: 13/235,931

(22) Filed: Sep. 19, 2011

(65) Prior Publication Data
US 2012/0091664 A1    Apr. 19, 2012

(30) Foreign Application Priority Data
Sep. 20, 2010  (JP) .................................. 2010-210299

(51) Int. Cl.
*F16J 15/32*    (2006.01)
*F16J 15/16*    (2006.01)

(52) U.S. Cl.
CPC ............ *F16J 15/3236* (2013.01); *F16J 15/164* (2013.01); *F16J 15/3208* (2013.01); *F16J 15/3252* (2013.01); *F16J 15/3268* (2013.01); *F16J 15/324* (2013.01)

(58) Field of Classification Search
CPC ... F16J 15/166; F16J 15/3236; F16J 15/3232; F16J 15/3252; F16J 15/3248; F16J 15/3268; F16J 15/164; F16J 15/3208; F16J 15/56; F16J 15/322; F16J 15/3216
USPC ......... 277/562, 565, 572, 551, 584, 576, 577, 277/553, 558, 566, 589
See application file for complete search history.

(56) References Cited

U.S. PATENT DOCUMENTS

| | | | | |
|---|---|---|---|---|
| 3,718,338 A * | 2/1973 | Traub | ............................ | 277/584 |
| 3,955,859 A * | 5/1976 | Stella et al. | .................... | 384/215 |
| 4,231,578 A * | 11/1980 | Traub | ............................ | 277/572 |
| 4,921,258 A * | 5/1990 | Fournier et al. | ................ | 277/615 |
| 5,143,382 A * | 9/1992 | Maringer | ...................... | 277/584 |
| 5,149,107 A * | 9/1992 | Maringer et al. | ............... | 277/556 |
| 5,524,904 A * | 6/1996 | Willi et al. | ...................... | 277/552 |
| 6,290,235 B1 * | 9/2001 | Albertson | ...................... | 277/510 |
| 6,896,269 B2 * | 5/2005 | Jackson | ........................ | 277/544 |
| 7,201,377 B2 * | 4/2007 | Chitren et al. | ................. | 277/347 |
| 7,341,258 B2 * | 3/2008 | Holt et al. | ...................... | 277/584 |
| 7,931,454 B2 * | 4/2011 | Yamaguchi | .......... | F04C 29/0078 384/490 |
| 8,814,170 B2 * | 8/2014 | Okamura et al. | ............. | 277/549 |

(Continued)

FOREIGN PATENT DOCUMENTS

| | | |
|---|---|---|
| JP | 63-106962 U | 7/1988 |
| JP | 08-105408 A | 4/1996 |
| JP | 2007-278086 A | 10/2007 |

*Primary Examiner* — Kristina Fulton
*Assistant Examiner* — Nicholas L Foster
(74) *Attorney, Agent, or Firm* — Buchanan Ingersoll & Rooney PC

(57) ABSTRACT

A sealing apparatus includes: a case having a hollow portion; a shaft passing through the hollow portion; and a sealing member sealing between the case and the shaft, and including a resin ring and a ring-shaped rubber cap. The rubber cap includes a base portion and a lip portion. The lip portion includes a first lip contacting the resin ring and a second lip configured to contact an inner peripheral surface of the case. If a pressure of a first chamber of the lip portion side is lower than a pressure of a second chamber at the side of the base portion, the second lip is separated from the case to relieve the pressure of the second chamber to the first chamber. The base portion includes a first restricting surface for restricting the base portion from moving, and a second surface for restricting the base portion from moving.

10 Claims, 8 Drawing Sheets

(56) References Cited

U.S. PATENT DOCUMENTS

| | | |
|---|---|---|
| 2007/0096550 A1 | 5/2007 | Yamaguchi et al. |
| 2007/0231177 A1* | 10/2007 | Yamaguchi et al. ........... 418/166 |
| 2010/0295253 A1* | 11/2010 | Tadano et al. ................. 277/549 |
| 2012/0286478 A1* | 11/2012 | Uesugi et al. ................. 277/549 |
| 2012/0308424 A1* | 12/2012 | Tadano et al. ................. 418/181 |
| 2014/0239598 A1* | 8/2014 | Hisada ................... F16J 15/002 277/394 |

\* cited by examiner

SEALING APPARATUS

CROSS-REFERENCE TO RELATED APPLICATION

This application is based upon and claims the benefit of priority of Japanese Patent Application No. 2010-210299 filed on Sep. 20, 2010, the contents of which are incorporated herein by reference in its entirety.

BACKGROUND

The present invention relates to a sealing apparatus capable of exhibiting a sealing performance by disposing a sealing member which includes a resin ring and a rubber ring into a gap between a housing and a shaft which passes through the housing and urging the resin ring against the shaft side, and for example, is applicable to sealing of a rotary pump.

Conventionally, a brake apparatus equipped with a rotary pump is disclosed in JP2007-278086A. In the rotary pump installed in the brake apparatus, a sealing member which includes a resin ring and a rubber ring is disposed in a gap between a driving shaft (a shaft) for driving the rotary pump and a case for receiving the rotary pump and prevents brake fluid from being leaked through the gap between the driving shaft and the case. Specifically, in the sealing member, the resin ring is disposed to contact the driving shaft and the rubber ring is disposed to contact the case. Accordingly, an elastic force of the rubber ring urges the resin ring against the driving shaft.

Basically, the sealing member can prevent the brake fluid from being leaked through the gap between the driving shaft and the case. However, in order to securely prevent the leakage of the brake fluid, a double seal structure including both an oil seal and the sealing member is supposed. That is, the oil seal is disposed in opposite side of the rotary pump relative to the sealing member. In this way, since the double seal structure including the sealing member and the oil seal is utilized, the leakage of the brake fluid can be prevented.

SUMMARY

However, when the sealing member is displaced in an axial direction of the driving shaft, a pumping action due to such a displacement is caused to increase the pressure in a region of the oil seal and the sealing member in a gap between the case and the driving shaft. On this account, there is a problem that a pressure leakage or the deterioration of the sealing ability can be caused.

Meanwhile, although the problem regarding to the sealing configuration of the rotary pump installed in the brake apparatus is described herein, a sealing apparatus employing a sealing member in a gap between the shaft and the case also has a similar problem. Further, a sealing apparatus for sealing another fluid other than the brake fluid has a similar problem.

The present invention has been made to solve the above-described problem and it is an object of the present invention to provide a sealing apparatus which is capable of restricting an axial displacement of a sealing member disposed between the shaft and the case.

To solve the object, according to a first aspect, a sealing apparatus includes: a case having a hollow portion; a shaft passing through the hollow portion; and a sealing member configured to seal between the case and the shaft and divide the hollow portion into a first chamber and a second chamber, the sealing member including a resin ring and a ring-shaped rubber cap fitted on an outer periphery of the resin ring. The rubber cap includes a ring-shaped base portion and a lip portion extending from an end of the base portion in an axial direction toward the first chamber. The lip portion includes a first lip contacting the resin ring and a second lip configured to contact an inner peripheral surface of the case. When a pressure of the first chamber is lower than a pressure of the second chamber, the second lip is separated from the inner peripheral surface of the case to relieve the pressure of the second chamber to the first chamber. The base portion includes a first restricting surface for restricting the base portion from moving with respect to the resin ring toward the first chamber, and a second surface for restricting the base portion from moving with respect to the resin ring toward the second chamber.

In this case, since the rubber cap of the sealing member is configured to have a base portion and a lip-shaped portion and is fixed in a predetermined position between the resin ring and the case by the first and second restricting surfaces of the base portion while the lip-shaped portion prevents the fluid from flowing from the first chamber to the second chamber, it is possible to restrict the axial displacement of the sealing member disposed between the shaft and the case. By doing so, the pumping action due to the axial displacement of the sealing member can be avoided. As a result, the rising of a pressure in the second chamber can be prevented, so that a pressure leakage or the deterioration of the sealing ability due to such a pressure rising can be avoided.

According to a second aspect, the first restricting surface is formed at a part of the base portion which projects radially inwardly than a base end of the first lip, or a part of the base portion which projects radially outwardly than a base end of the second lip.

In this case, for example, the first restricting surface can be formed at a part of the base portion which projects radially inwardly or outwardly. Thereby, the ring-shaped base portion can be formed larger than the base end o the lip-shaped portion in a radial direction thereof. Accordingly, it is possible to stably support the rubber ring.

According to a third aspect, the base portion includes a projection which is squashed by the inner peripheral surface of the case to generate a pressing force to press the resin ring to the shaft when the seal member is disposed between the case and the shaft.

In this case, since the projection is squashed to cause the base portion to urge the resin ring against the shaft, it is possible to accurately seal a gap between the resin ring and the shaft.

According to a fourth aspect, the resin ring includes an abutment surface configured to contact at least one of the first and second restricting surface to restrict the rubber cap from moving with respect to the resin ring in the axial direction, and the abutment surface is inclined in the axial direction and in a radial direction of the resin ring.

In this case, since the abutment surface is inclined in the axial direction and in a radial direction of the resin ring, when the rubber ring is mounted between the resin ring and the case or the rubber ring is urged in the axial direction by the pressure of the fluid, the rubber ring can be urged in the radial direction by the reaction force transmitted from the abutment surface to the restricting surface. Accordingly, it is possible to significantly improve the sealing performance of the sealing member.

According to a fifth aspect, the base portion includes a holding portion projecting radially inwardly from the base portion, the holding portion having an arc-shaped section passing through an axis of the shaft, the resin ring includes an accommodating groove to which the rubber cap is fitted and an accommodating portion accommodating the holding portion, and the first restricting surface is formed by a part of the holding portion which contacts an inner wall surface of the accommodating portion.

In this case, since the holding portion has an arc-shaped section, the holding portion can be fitted to the accommodation portion even if the dimension of the resin ring is irregular in the axial direction of the accommodation portion. Accordingly, regardless of the irregular dimension of the holding portion, the same effect as the first embodiment can be achieved.

Meanwhile, the reference numeral in parentheses of the respective means corresponds to the specific means according to the preferred embodiment.

BRIEF DESCRIPTION OF DRAWINGS

Hereinafter, preferred embodiments of the present invention will be described in detail with reference to the accompanying drawings. In this case, the same or similar components are designated with the same reference numerals.

DESCRIPTION OF EXEMPLARY EMBODIMENTS

First Embodiment

Figure 1:
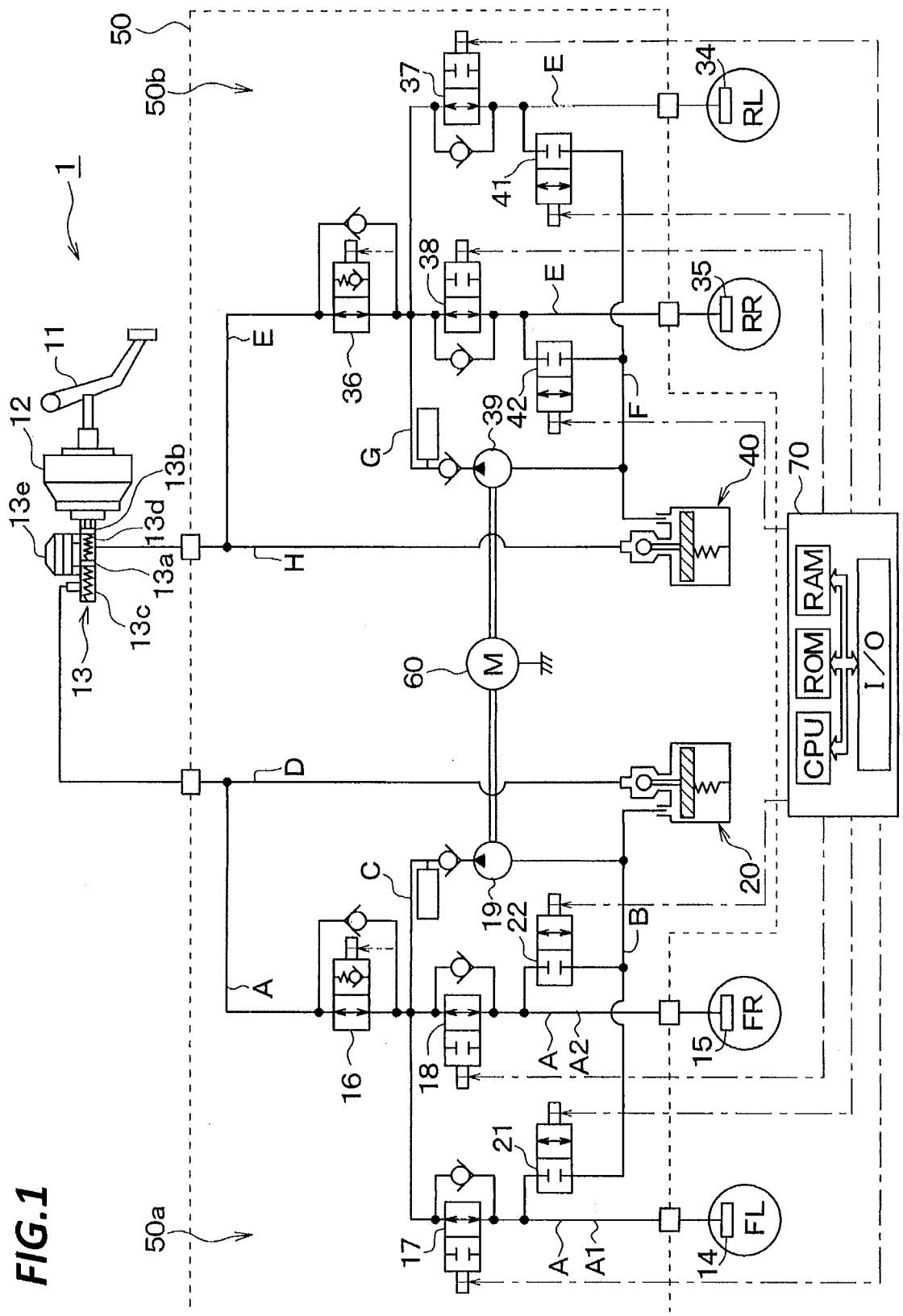
FIG. 1 is a view schematically illustrating a brake piping system of a brake apparatus for a vehicle incorporating a rotary pump apparatus according to a first embodiment of the present invention.

Hereinafter, the present invention will be described in detail with reference to the embodiment illustrated in accompanying drawings. FIG. 1 is a view schematically illustrating a brake piping system of a brake apparatus for a vehicle incorporating a rotary pump apparatus according to a first embodiment of the present invention. Hereinafter, by referring to FIG. 1, a basic configuration of a brake apparatus for a vehicle will be described. Although there is described an example where the brake apparatus for a vehicle according to the present invention is employed in a front wheel drive vehicle incorporating a hydraulic circuit of the front and back piping, the brake apparatus is also applicable to the X-piping system of the vehicle including each piping system of a right front wheel-left rear wheel and a left front wheel-right rear wheel.

In FIG. 1, when a driver treads a brake pedal 11, a tread force is increased by a booster 12 to press master pistons 13a, 13b provided in a master cylinder 13 (hereinafter, referred to as "M/C"). By doing so, the same M/C pressure is generated in a primary chamber 13c and a secondary chamber 13d which are partitioned by the master pistons 13a, 13b. The M/C pressure is transmitted to each of the wheel cylinders 14, 5, 34, 35 (hereinafter, referred to as "W/C") through an actuator 50 for controlling the brake hydraulic pressure. The M/C 13 is provided with a master reservoir 13e which has a path respectively communicating with the primary chamber 13c and the secondary chamber 13d.

The actuator 50 for controlling the brake hydraulic pressure includes a first piping system 50a and a second piping system 50b. The first piping system 50a controls a brake hydraulic pressure which is applied on the left-front wheel FL and the right-front wheel FR and the second piping system 50b controls a brake hydraulic pressure which is applied on the right-rear wheel RR and the left-rear wheel RL.

Since the configurations of the first piping system 50a and the second piping system 50b are the same to each other, only the first piping system 50a will be described and the description of the second piping system 5b will be omitted.

The first piping system 50a includes a pipe line A as a main pipe line which transmits the M/C pressure to the W/C 14 provided at the left-front wheel FL and the W/C 15 provided at right-front wheel FR and generates the W/C pressure.

Furthermore, the pipe line A is provided with a first differential pressure control valve 16 which is capable of switching the state of the pipe line between a communication state and a differential pressure state. The first differential pressure control valve 16 has a configuration that the valve position thereof is regulated to the communication state during a normal brake operation in which the driver operates the brake pedal 11 (i.e., when the movement of the vehicle not controlled) and regulated to the differential pressure state when an electric current is applied on a solenoid coil provided in the first differential pressure control valve 16. In this case, the differential pressure state thereof is increased to a high level as the strength of the electric current is increased.

In a case that the first differential pressure control valve 16 is in the differential pressure state, only when the brake hydraulic pressure of the W/C 14, 15 side is higher than the pressure of the M/C 14, 15 side in a predetermined value, just the flow of the brake hydraulic pressure from the W/C 14, 15 side to the M/C 13 side is allowed. For this reason, the pressure of the W/C 14, 15 is always maintained so as not to exceed the pressure of the M/C 13 over the predetermined value.

Further, the pipe line A is branched into two pipe lines A1, A2 on a side of the W/C 14, 15 downstream from the first differential pressure control valve 16. The pipe line A1 is provided with a first pressure increasing control valve 17 which controls the pressure increasing of the brake hydraulic pressure applied on the W/C 14 and the pipe line A2 is provided with a second pressure increasing control valve 18 which controls the pressure increasing of the brake hydraulic pressure applied on the W/C 15.

The first and second pressure increasing control valves 17, 18 are composed of two-way electronic valve which is capable of switching between a communication state and a blocking state thereof. Specifically, the first and second pressure increasing control valves 17, 18 are provided with a solenoid valve and have a normal open type which is switched to the communication state when the value of the control electric current applied on the solenoid coil becomes zero (i.e., when the electric current is not applied) and is switched to the blocking state when the control electric current is applied on the solenoid valve (i.e., when the electric current is applied). In this case, as the first and second pressure increasing control valves 17, 18, in place of the two-way electronic valve mentioned above, an electronic valve of which valve position can be regulated so that the differential pressure state thereof is increased to a high level as the strength of the electric current is increased (or decreased) may be used.

A pressure reducing pipe line B is provided to connect the W/C 14, 15 and the first and second pressure increasing control valves 17, 18 in the pipe line A and a pressure regulating reservoir 20 to each other. The pressure reducing pipe line B is provided with a first pressure reducing control valve 21 and a second pressure reducing control valve 22 which are composed of a two-way electronic valve capable of switching between a communication state and a blocking state thereof. In this case, the first pressure reducing control valve 21 and the second pressure reducing control valve 22 have a normal close type.

A feedback pipe line C is provided between the pressure regulating reservoir 20 and the main pipe line A. The feedback pipe line C is provided with a self-suction pump 19 which is driven by the motor 60 and is configured to intake and discharge the brake fluid from the pressure regulating reservoir 20 toward the MC 13 side or the W/C 14, 15 side. The motor 60 is driven by controlling an electric current applied on a motor relay (not illustrated).

Further, an auxiliary pipe line D is provided between the pressure regulating reservoir 20 and the M/C 13. In this case, the pump 19 intakes a brake fluid from the M/C 13 via the auxiliary pipe line D and discharges the brake fluid into the main pipe line A. By doing so, when the movement of the vehicle movement is controlled, it is possible to supply the brake fluid to the W/C 14, 15 for increasing the W/C pressure of a vehicle wheel to be controlled. Meanwhile, although the first piping system 50a is described herein, the second piping system 50b has the same configuration as the first piping system. That is, the second piping system 50b includes the same components as each component included in the first piping system 50a. Specifically, in the second piping system 50b, a second differential pressure control valve 36 is provided to correspond to the first differential pressure control valve 16, third and fourth pressure increasing control valves 37, 38 are provided to correspond to the first and second pressure increasing control valves 17, 18, third and fourth pressure reducing control valves 41, 42 are provided to correspond to the first and second pressure reducing control valves 21, 22, a pump 39 is provided to correspond to the pump 19, a reservoir 40 is provided to correspond to the reservoir 20, and pipe lines E~H are provided to correspond to the pipe lines A~D.

In addition, a brake ECU 70 corresponds to a vehicle movement control device of the present invention which serves as a control part of a brake control system 1. The brake ECU is constituted with a conventional micro-computer including CPU, ROM, RAM, and I/O port. The brake ECU performs various calculations according to the program stored on the ROM and also performs a vehicle movement control such as a side-slip prevention control. That is, the brake ECU 70 calculates various physical quantities based on the detection value of various sensors (not illustrated) and determines whether to perform the vehicle movement control or not based on the calculated results. In addition, when it is determined that the vehicle movement control is performed, the brake ECU obtains a control quantity of a vehicle wheel to be controlled, that is, a W/C pressure generated in the W/C of the vehicle wheel. Based on the obtained result, the brake ECU 70 controls the supply of an electric current to each control valve 16-18, 21, 22, 36-38, 41, 42 and controls the amount of electric current of the motor 60 for driving the pumps 19, 39. Accordingly, it is possible to control the W/C pressure of the vehicle wheel to be controlled and also to control the vehicle movement.

For example, when a pressure is not generated in the M/C 13 as in a traction control or a side-slip prevention control, the brake fluid is delivered to the W/C 14, 15, 34, 34 downstream from the first and second differential pressure control valves 16, 36 via the pipe lines D, H by driving the pumps 19, 39 and switching the first and second differential pressure control valves 16, 36 to the differential pressure state. And, the W/C pressure of the wheel to be controlled is increased or decreased by suitably controlling the first to fourth pressure increasing control valves 17, 18, 37, 38 or the first to fourth pressure reducing control valves 21, 22, 41, 42, so that the W/C pressure is controlled to a desired value.

When the control of the anti-skid braking system (ABS) is performed, the W/C pressure of the wheel to be controlled is increased or decreased by suitably controlling the first to fourth pressure increasing control valves 17, 18, 37, 38 or the first to fourth pressure reducing control valves 21, 22, 41, 42 and driving the pumps 19, 39, so that the W/C pressure is controlled to a desired value.

Figure 2:
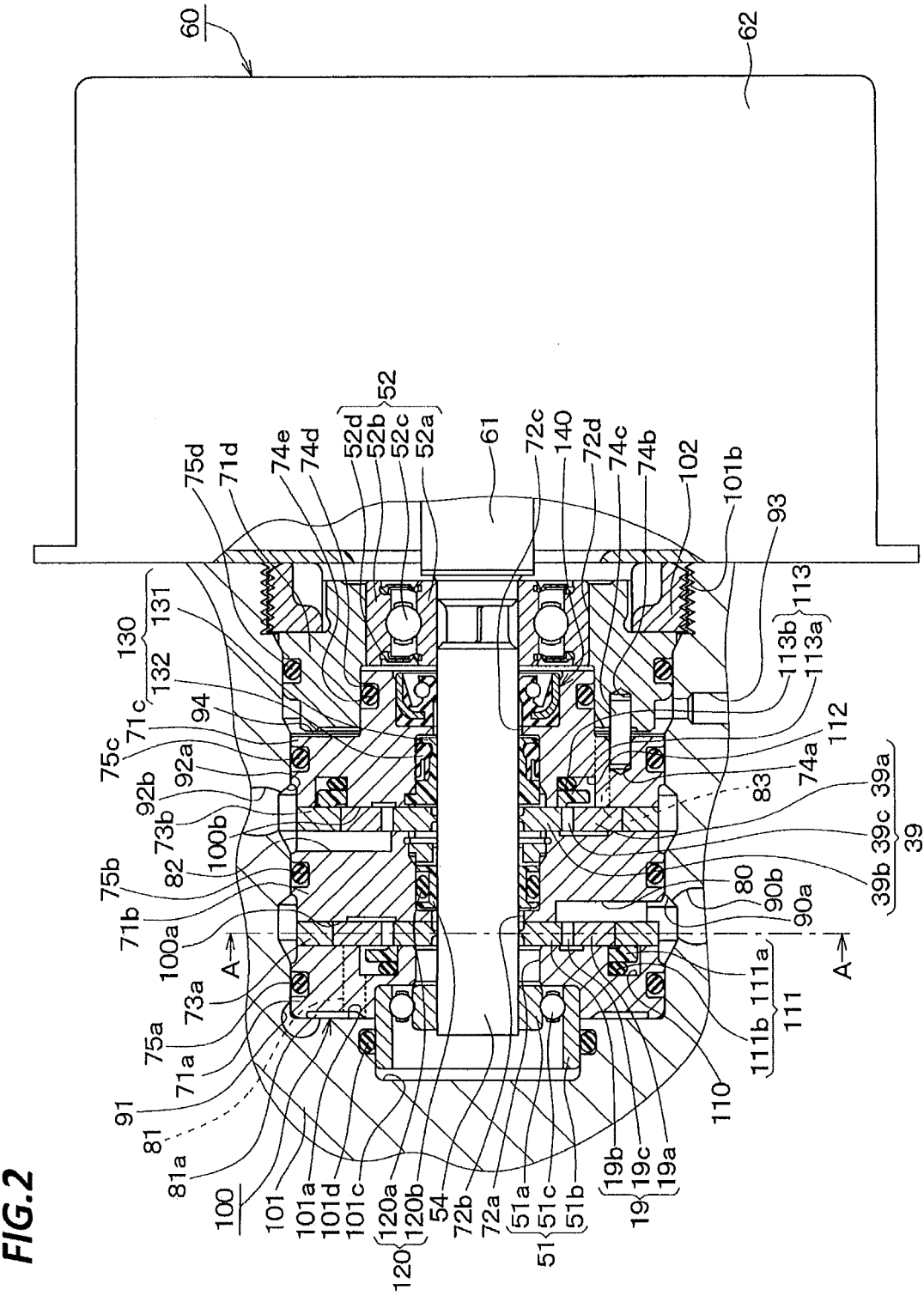
FIG. 2 is a sectional view illustrating the rotary pump apparatus including a pump body 100 which has rotary pumps 19, 39 and a motor 60.

Next, the configuration of the rotary pump apparatus in the brake apparatus for the vehicle mentioned above, that is, the detailed configurations of the rotary pumps 19, 39 will be described. FIG. 2 is a sectional view illustrating the rotary pump apparatus including a pump body 100 which has rotary pumps 19, 39 and a motor 60. FIG. 2 illustrates a state where the pump body 100 is assembled to a housing 101 of the actuator 50 for controlling the brake hydraulic pressure. In this case, the pump body is assembled to the housing of the actuator while making the up and down directions in accompanying drawings as the vertical direction of the vehicle.

As mentioned above, the brake apparatus for the vehicle is composed of the first piping system 50a and the second piping system 50b. Accordingly, the pump body 100 is provided with a rotary pump 19 for the first piping system 50a illustrated in FIGS. 1 and 2 and a rotary pump 39 for the second piping system 50b illustrated in FIG. 2.

In this case, the motor 60 rotates the driving shaft 54 supported by a first bearing 51 and a second bearing 52 to drive the rotary pumps 19, 39 incorporated in the pump body 100. A casing constituting the outer shape of the pump body 100 is composed of first, second, third and fourth cylinders (side plates) 71a, 71b, 71c, 71d and first and second cylindrical center plates 73a, 73b. In addition, the first bearing 51 is disposed in the first cylinder 71a and the second bearing 52 is disposed in the fourth cylinder 71d.

The first cylinder 71a, the first cylindrical center plate 73a, the second cylinder 71b, the second cylindrical center plate 73b and the third cylinder 71c are subsequently stacked and peripheral edges of the stacked part are joined by welding operation. Here, a first case which is formed as a unit by such a welding operation is disposed in coaxial with the fourth cylinder 71d which corresponds to a second case to form the case of the pump body 100. Meanwhile, end surfaces of the third cylinder 71c and the fourth cylinder 71d opposed to each other are provided with concave portions 74a, 74b into which a pin 74c is inserted. The pin 74c is configured to align the first case and the second case to each other in the rotating direction of the driving shaft 54.

In this way, the pump body 100 is formed as an integral structure and inserted into an approximately cylindrical-shaped concave portion 101a which is formed on the housing 101 of the actuator 50 for controlling the brake hydraulic pressure from a right direction (hereinafter, the direction in which the pump body 100 is inserted into the concave portion of the housing 101 is referred to simply as "insertion direction") of the accompanying drawing.

Further, a ring-shaped male screw member (screw) 102 is threadedly engaged into a female screw groove 101b recessed from an entrance of the concave portion 101a and thus the pump body 100 is fixed to the housing 101. By such a threaded engagement of the male screw member 102, the pump body 100 is prevented from separating from the housing 101.

In a position corresponding to the leading end of the driving shaft 54 in the insertion direction, a second circular concave portion 101c is formed at the concave portion 101a of the housing 101. The diameter of the second circular concave portion 101c is equal to an outer diameter of the first bearing 51 which is projected from the first cylinder 71a and is smaller than an outer diameter of the first cylinder 71a. Accordingly, a portion of the first bearing 51 which is projected from the end surface of the first cylinder 71a goes into the second concave portion 101c and a portion of a bottom surface of the concave portion 101a other than the second concave portion 101c faces toward the end surface of the first cylinder 71a.

Further, each of the first to fourth cylinders 71a-71d are provided with first to fourth center holes 72a, 72b, 72c, 72d. The driving shaft 54 is inserted into the first to fourth center holes 72a, 72b, 72c, 72d and supported by the first bearing 51 which is fixed to an inner peripheral of the first center hole 72a formed on the first cylinder 71a and the second bearing 52 which is fixed to an inner peripheral of the fourth center hole 72d formed on the fourth cylinder 71d. As the first bearing 51 and the second bearing 52, a bearing having arbitrary structure may be used, but a narrow ball bearing is used in the present embodiment.

Specifically, the first bearing 51 includes an inner race 51a, an outer race 51b and a rolling body 51c, and the driving shaft 54 is fitted into an opening of the inner race 51a so that it is pivotally supported thereon. Since the center holes 72a of the first cylinder 71a is spread at a front portion in the insertion direction in a size corresponding to the outer diameter of the first bearing 51, the first bearing 51 is fixed to the spread portion of the first cylinder 71a. Since the axial length of the outer race 51b is longer than the axial length of the inner race 51a, the outer race 51b is projected from the end surface of the first cylinder 71a and the projected portion of the outer race is fitted into the second concave portion 101c. Meanwhile, an O ring 101d is provided at inner wall of the second concave portion 101c so as to surround the periphery of the outer race 51b.

Further, the second bearing 52 includes an inner race 52a, an outer race 52b and a rolling body 52c, and the outer race 52b is fitted into the center hole 72d of the fourth cylinder 71d so that it is fixed thereon. The driving shaft 54 is fitted into an opening of the inner race 52a of the second bearing 52 so that it is pivotally supported thereon. The second bearing 52 is also provided with a sealing plate 52d. In this case, since the second bearing 52 also serves to support a rotation shaft 61 which corresponds to an output shaft of the motor 60, as will described later, the axial size of the second bearing 52 is dimensioned to simultaneously support two shafts.

Figure 3:
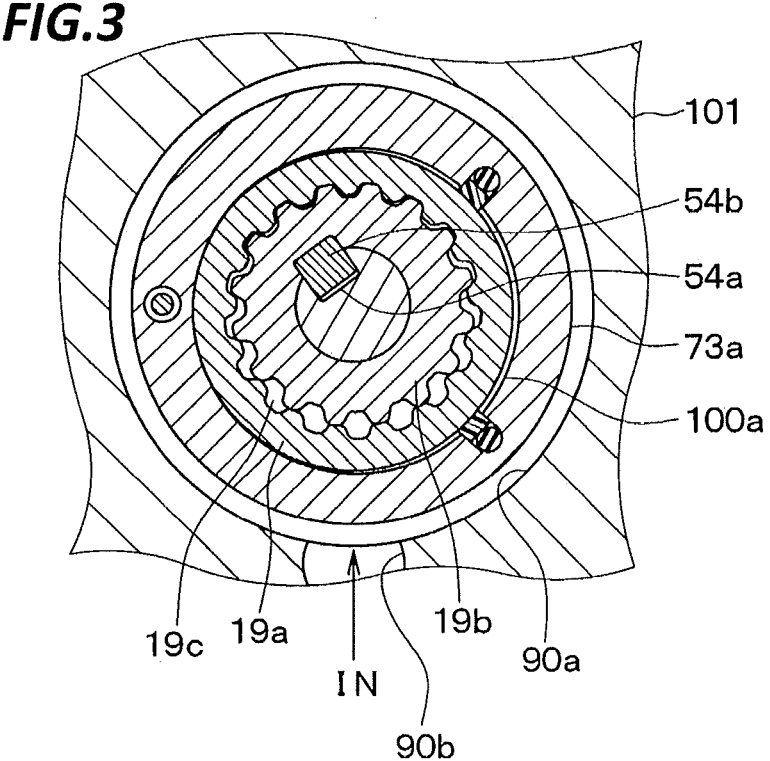
FIG. 3 is a sectional view taken along line A-A of FIG. 2.

Meanwhile, the rotary pumps 19, 39 are provided at a region formed between the first bearing 51 and the second bearing 52. FIG. 3 is a sectional view taken along line A-A of FIG. 2 and illustrates the detailed structures of the rotary pumps 19, 39.

The rotary pump 19 is arranged within a rotor chamber 100a which is formed by interposing the opposite sides of the first cylindrical center plate 73a between the first cylinder 71a and the second cylinder 71b and is constituted with an internal gear pump (trochoid pump) which is driven by the driving shaft 54.

Specifically, the rotary pump 19 includes a rotation part that is composed of an outer rotor 19a of which inner periphery is provided with an inner gear portion and an inner rotor 19b of which outer periphery is provided with an outer gear portion and the driving shaft 54 is inserted into a hole formed at the center of the inner rotor 19b. A key 54b is embedded into a hole 54a formed at the driving shaft 54 so as to transmit a torque to the inner rotor 19b.

The inner gear portion of the outer rotor 19a and the outer gear portion of the inner rotor 19b are engaged with each other to form a plurality of voids 19c. In this case, the sizes of the voids 19c are varied depending on the rotation of the driving shaft 54 to suction/discharge the brake fluid.

Meanwhile, the rotary pump 39 is arranged within a rotor chamber 100b which is formed by interposing the opposite sides of the second cylindrical center plate 73b between the second cylinder 71b and the third cylinder 71c. Similar to the rotary pump 19, the rotary pump 39 includes an outer rotor 39a and an inner rotor 39b, and a gear portion of the outer rotor 39a and a gear portion of the inner rotor 39b are engaged with each other to form a plurality of voids 39c. Herein, the rotary pump 39 is constituted with an internal gear pump which is configured to suction/discharge the brake fluid by the plurality of voids 39c. The rotary pump 39 is arranged to correspond to an arrangement that the rotary pump 19 is rotated about the driving shaft 54 by approximately 180°. With these arrangements, the suction voids 19c, 39c and the discharge voids 19c, 39c of the rotary pumps 19, 39 are respectively symmetrically arranged. By doing so, it is possible to compensate for a force which is applied on the driving shaft 54 due to a high hydraulic pressure on a discharge side.

The second cylinder 71b is formed with a suction opening 80 which is communicated with the suction void 19c of the rotary pump 19. The suction opening 80 extends from an end surface of the second cylinder 71b on a side of the rotary pump 19 to an outer peripheral surface thereof. In addition, an annular groove 90a is entirely formed along an inner peripheral surface of the concave portion 101a in the housing 101 and a suction pipe line 90b is formed to be connected to a portion of the annular groove 90a. In this way, the suction opening 80 is connected to the suction pipe line 90b via the annular groove 90a. Accordingly, the brake fluid is introduced from the outer periphery side of the pump body 100 to the rotary pump 19 through the suction pipe line 90b or the annular groove 90a and the suction opening 80.

Further, the first cylinder 71a is formed with a discharge opening 81 which is communicated with the discharge void 19c of the rotary pump 19. The discharge opening 81 is formed to penetrate from an end surface of the first cylinder 71a on a side of the rotary pump 19 to an opposite end surface thereof. The discharge opening 81 is connected to a discharge pipe line 91 which is formed to reach a bottom surface of the concave portion 101a in the housing 101. In this way, the rotary pump 19 is configured to discharge the brake fluid from the bottom side of the concave portion 101a in the pump body 100 through the discharge opening 81 and the discharge pipe line 91. More particularly, the discharge opening 81 is configured as follows.

In addition to the portion penetrating from the end surface of the first cylinder 71a on a side of the rotary pump 19 to an opposite end surface thereof, the discharge opening 81 further includes a passage at an end surface of the first cylinder 71a on the rotation part side of the rotary pump 19, which is defined by an annular groove 110 formed to surround the driving shaft 54.

Specifically, a ring-shaped sealing member 111 which is arranged to press the outer rotor 19a and the inner rotor 19b is provided in the annular groove 110. The sealing member 111 includes a resin member 111a which is arranged in the rotation part side and a rubber member 111b which presses the resin member 111a against the rotation part side. At an inner peripheral side of the sealing member 111, clearances are provided between the suction void 19c and the first center plate 73a and between the outer periphery of the outer rotor 19a opposed to the suction void 19c and the first center plate 73a. Also, at an outer peripheral side of the sealing member 111, clearances are provided between the discharge void 19c and the first center plate 73a and between the outer periphery of the outer rotor 19a opposed to the discharge void 19c and the first center plate 73a. That is, the sealing member 111 serves to seal between a relative low pressure region at the inner periphery of the sealing member 111 and a relative high pressure region at the outer periphery thereof.

Also, the sealing member 111 is configured to contact the inner periphery of the annular groove 110 and to partially contact the outer periphery thereof. In this case, the portion of the annular groove 110 which does not contact the sealing member 111 becomes a clearance. That is, the annular groove 110 is provided with a region of which entire circumference does not contact the sealing member 111 and the brake fluid can flow through the region. The discharge opening 81 is configured to include the clearance of the annular groove 110 as configured above.

Further, at the front end surface of the first cylinder 71a in the insertion direction, a communication passage 81a is formed for communicating the discharge opening 81 and the discharge pipe line 91. The communication passage 81a is formed to entirely surround the periphery of the first bearing 51. The communication passage 81a can securely communicate the discharge opening 81 and the discharge pipe line 91, even if the position of the discharge pipe line 91 is shifted from the discharge opening 81. Specifically, when the end surface of the first cylinder 71a contacts the bottom surface of the concave portion 101a, a clearance between the first cylinder and the concave portion is disappeared and thus there is a risk that the discharge opening 81 and the discharge pipe line 91 are not communicated with each other. However, since the communication passage 81a is provided, it is possible to securely communicate the discharge opening 81 and the discharge pipe line 91.

Further, at an end surface of the second cylinder 71b opposed to the end surface thereof on which the suction opening 80 is formed, a suction opening 82 which is communicated with the suction void 39c in the rotary pump 39 is provided. The suction opening 82 is formed in a range from the end surface of the second cylinder 71b on a side of the rotary pump 39 to the outer periphery thereof. In addition, an annular groove 92a is entirely formed along an inner peripheral surface of the concave portion 101a in the housing 101 and a suction pipe line 92b is formed to be connected to a portion of the annular groove 92a. In this way, the suction opening 82 is connected to the suction pipe line 92b via the annular groove 92a. Accordingly, the brake fluid is introduced from the outer periphery side of the pump body 100 to the rotary pump 39 through the suction pipe line 92b or the annular groove 92a and the suction opening 82.

Further, the third cylinder 71c is formed with a discharge opening 31 which is communicated with the discharge void 39c of the rotary pump 39. The discharge opening 83 is formed to penetrate from an end surface of the third cylinder 71c on a side of the rotary pump 39 to an opposite end surface thereof. The discharge opening 83 is connected to a discharge pipe line 93 which is formed to reach an inner peripheral surface of the concave portion 101a in the housing 101, via a clearance 94 between the third cylinder 71c and the fourth cylinder 71d. In this way, the rotary pump 39 is configured to discharge the brake fluid from the outer peripheral surface of the pump body 100 through the discharge opening 83, the clearance 94 and the discharge pipe line 93. More particularly, the discharge opening 83 is configured as follows.

In addition to the portion penetrating from the end surface of the third cylinder 71c on a side of the rotary pump 39 to an opposite end surface thereof, the discharge opening 83 further includes a passage at an end surface of the third cylinder 71c on the rotation part side of the rotary pump 39, which is defined by an annular groove 112 formed to surround the driving shaft 54.

Specifically, a ring-shaped sealing member 113 which is arranged to be interposed between the outer rotor 39a and the inner rotor 39b is provided in the annular groove 112. The sealing member 113 includes a resin member 113a which is arranged in the rotation part side and a rubber member 113b which presses the resin member 113a against the rotation part side. At an inner peripheral side of the sealing member 113, clearances are provided between the suction void 39c and the second center plate 73b and between the outer periphery of the outer rotor 39a opposed to the suction void 39c and the second center plate 73a. Also, at an outer peripheral side of the sealing member 113, clearances are provided between the discharge void 39c and the first second plate 73b and between the outer periphery of the outer rotor 39a opposed to the discharge void 39c and the second center plate 73b. That is, the sealing member 113 serves to seal between a relative low pressure region at the inner periphery of the sealing member 113 and a relative high pressure region at the outer periphery thereof.

Also, the sealing member 113 is configured to contact the inner periphery of the annular groove 112 and to partially contact the outer periphery thereof. In this case, the portion of the annular groove 112 which does not contact the sealing member 113 becomes a clearance. That is, the annular groove 112 is provided with a region of which entire circumference does not contact the sealing member 113 and the brake fluid can flow through the region. The discharge opening 83 is configured to include the clearance of the annular groove 112 as configured above.

Meanwhile, the suction pipe line 90b and the discharge pipe line 91 in FIG. 2 correspond to the pipe line C in FIG. 1 and the suction pipe line 92b and the discharge pipe line 93 in FIG. 2 correspond to the pipe line G in FIG. 1.

Further, a diameter of the second center hole 72b of the second cylinder 71b is partially larger than the driving shaft 54 and a sealing member 120 for blocking between the rotary pump 19 and the rotary pump 39 is accommodated in the large-diameter portion thereof. The sealing member 120 includes a ring-shaped O-ring 120a and a ring-shaped resin member 120b in which a groove is formed with a radial direction being a depth direction and the ring-shaped O-ring 120a is fitted into the resin member 120b. The resin member 120b is pressed by an elastic force of the O-ring 120a to be brought in contact with the driving shaft 54.

Similarly, a diameter of the third center hole 72c of the third cylinder 71c is partially larger than the driving shaft 54 and a sealing member 130 for blocking between the rotary pump 19 and the exterior part of the housing 101 is accommodated in the large-diameter portion thereof. The detailed configurations of the sealing member 130 will be described later.

In addition, an oil seal 140 is provided in a region which is closer to the motor 60 than the sealing member 140. By this configuration, although the sealing member 130 can basically prevent the brake fluid from being leaked through third center hole 72c to the outside, the oil seal can securely prevents the leakage of the brake fluid.

Further, a portion of the third cylinder 71c toward the fourth cylinder 71d has an outer diameter smaller than an inner diameter of the concave portion 101a and the small-diameter portion is fitted into the fourth center hole 72d of the fourth cylinder 71d. A portion of the outer periphery of the third cylinder 71c which is fitted into the fourth center hole 72d of the fourth cylinder 71d is formed with a groove 74d into which a O-ring 74e is fitted. The O-ring 74e can prevent the brake fluid from being leaked through a space between the third cylinder 71c and the fourth cylinder 71d toward the second bearing 52.

In this case, it is noted that the portion of the third cylinder 71c fitted into the fourth center hole 72d of the fourth cylinder 71d is shorter than the small-diameter portion of the third cylinder 71c. On this account, a clearance 94 is provided between surfaces of the third cylinder 71c and the fourth cylinder 71d which face to each other and the brake fluid discharged from the discharge opening 83 of the rotary pump 39 is directed to the discharge pipe line 93 through the clearance 94.

Meanwhile, each of the first to fourth cylinders 71a-71d is respectively provided at its outer peripheral surface with O-rings 75a, 75b, 75c, 75d. These O-rings 75a, 75b, 75c, 75d are configured to seal the brake fluid in the suction pipe lines 90b, 92b or the discharge pipe lines 91, 93 which are formed in the housing 101. In this case, the O-ring 75a is provided between the suction pipe line 90b and the discharge pipe line 91, the O-ring 75b is provided between the suction pipe line 90b and the suction pipe line 92b, the O-ring 75c is provided between the suction pipe line 92b and the discharge pipe line 93, and the O-ring 75d is provided between the discharge pipe line 93 and the exterior portion of the housing 101.

In addition, an outer peripheral surface of the leading end in an entrance side of the concave portion of the fourth cylinder 71d has a small diameter to form a stepped portion. The ring-shaped male screw member 102 is fitted into the small-diameter portion to allow the pump body 100 to be fixed. Further, in the outer peripheral surface of the fourth cylinder 71d, the rearmost part in the insertion direction becomes a tapered surface of which diameter gradually increases. Since the fourth cylinder 71d is fastened by the male screw member 102, the tapered surface of the fourth cylinder 71d is pressed against a tapered surface which formed on the concave portion 101a of the housing 101. By doing so, even if the driving shaft 54 rotates, there is no case that the fourth cylinder rotates according to the rotation of the driving shaft.

The pump body 100 has a configuration as mentioned above. Next, the detailed configurations of the sealing member 130 will be described.

Figure 4:
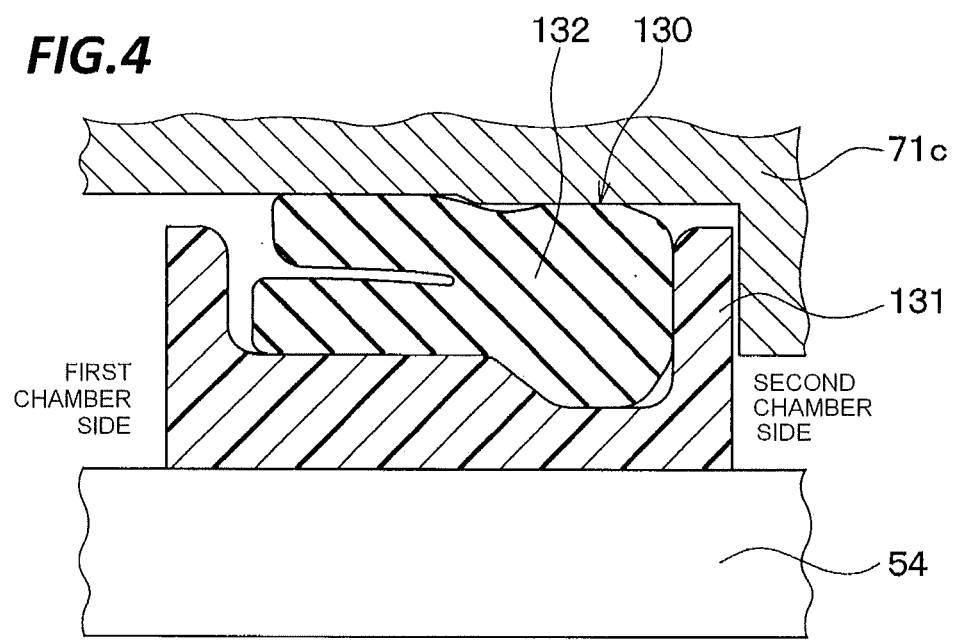
FIG. 4 is a partial magnified sectional view illustrating a region adjacent to a sealing member 130.

FIG. 4 is a partial magnified sectional view illustrating a region adjacent to a sealing member 130. As illustrated in FIG. 4, the ring-shaped rubber cap 132 is fitted onto the ring-shaped resin ring 131 and the resin ring 131 is pressed by an elastic force of the rubber cap 132 to be brought into contact with the driving shaft 54.

Figure 5:
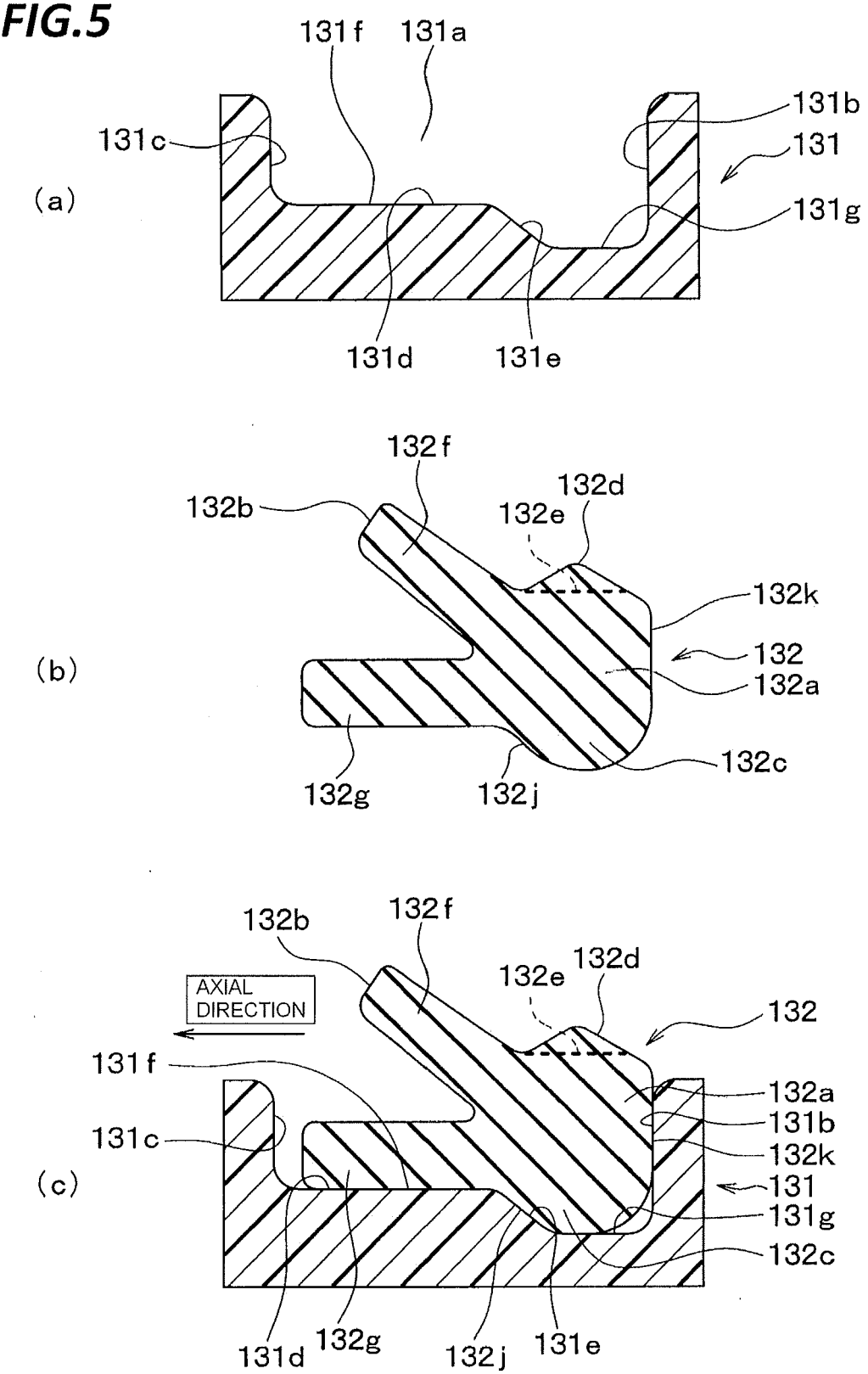
FIGS. 5A and 5B are partial magnified sectional views respectively illustrating a resin ring 131 and a rubber cap 132 before being mounted on the rotary pump apparatus.
FIG. 5C is a partial magnified sectional view illustrating a state where the rubber cap 132 is fitted on the resin ring 131.

FIGS. 5A and 5B are partial magnified sectional views respectively illustrating a resin ring 131 and a rubber cap 132 before being mounted on the rotary pump apparatus, and FIG. 5C is a partial magnified sectional view illustrating a state where the rubber cap 132 is fitted on the resin ring 131.

As illustrated in FIGS. 5A and 5C, the resin ring 131 is at its ring-shaped peripheral surface formed with a cap accommodation groove 131a of which a radial direction is a depth direction. The rubber cap 132 is fitted into the cap accommodation groove 131a.

The cap accommodation groove 131a is composed of wall surfaces 131b, 131c which are provided at both sides in an axial direction and a bottom surface 131d. The wall surfaces 131b, 131c includes a surface parallel to the radial direction, i.e., a surface perpendicular to the axial direction. In the present embodiment, the bottom surface 131d is formed as a stepped portion and partitions the cap accommodation groove 131a into a shallow region and a deep region. A grooved inclined surface 131e which is obliquely inclined relative to the axial and radial directions is formed at the boundary portion between the shallow region and the deep region. The shallow region of the cap accommodation groove 131a constitutes a lip accommodation portion 131f and the deep region of the cap accommodation groove 131a constitutes an accommodation portion 131g for accommodating a holding portion (hereinafter, referred to simply as "accommodation portion").

As illustrated in FIGS. 5A and 5B, the rubber cap 132 includes a thick-walled ring-shaped base portion 132a and a lip-shaped portion 132b. The base portion 132a of the rubber cap 132 is disposed in the accommodation portion 131g and the lip-shaped portion 132b thereof is disposed in the lip accommodation portion 131f.

The base portion 132a includes a holding portion 132c which has an arc-shaped section and projects radially inwards from a base end of the lip-shaped portion 132b in the inner periphery side, specifically a base end of a lip 132g which will be described later. In addition, the base portion 132a includes an annular projection 132d which has a triangle-shaped section and projects radially outwards from the base end of the lip-shaped portion 132b in the outer periphery side, specifically a base end of a lip 132f which will be described later.

The holding portion 132c is fitted and accommodated in the accommodation portion 131g and contacts the grooved inclined surface 131e to restrict the movement of the rubber cap 132 forward in the insertion direction. By doing so, the holding portion serves to hold the rubber cap 132 in a predetermined position.

When the sealing member 130 is disposed between the driving shaft 54 and the third cylinder 71c, the annular projection 132d is partially or entirely squashed by the third cylinder 71c to generate an elastic reaction force and this reaction force urges the resin ring 131 against the driving shaft 54. That is, in a state where the base portion 132a is fitted into the accommodation portion 131g, the annular projection 132d projects radially outwards from the base portion 132a so that the total thickness of the resin ring 131 and the base portion 132a is larger than the clearance between the driving shaft 54 and the third cylinder 71c. The annular projection 132d is provided with a slit 132e which extends axially. Accordingly, when the sealing member 130 is interposed between the driving shaft and the third cylinder so that the pressure of the rotary pump 39 side is lower than the pressure of a side opposite to the rotary pump 39, the brake fluid escaped into a space between the sealing member 130 and the oil seal 140 through the slit 132e can flow back toward the rotary pump 39.

The lip-shaped portion 132b is formed in a shape of a lip extending from one end of the base portion 132a in an axial direction, in other words, the lip-shaped portion 132b is configured to have a V-shaped section. Specifically, the lip-shaped portion 132b is disposed on a side of the base portion 132a toward the rotary pump 39, one lip (second lip) 132f of the lip-shaped portion contacts the inner peripheral surface of the third cylinder 71c and the other lip (first lip) 132g of the lip-shaped portion contacts the bottom surface 131d of the resin ring 131. In this case, the lip 132f is obliquely inclined in axial and radial directions. When the sealing member 130 is placed between the driving shaft 54 and the third cylinder 71c, the lip 132f is squashed radially inwards to be brought in contact with the inner peripheral surface of the third cylinder 71c.

The pump body 100 is configured to include the sealing member 130 mentioned above. In such a pump body 100, the driving shaft 54 is rotated by the rotation shaft 61 of the motor 60, thereby rotating the rotary pumps incorporated into the pump body. As a result, a suction or discharge operation of the brake fluid is performed.

For example, when the brake ECU 70 performs various vehicle movement controls such as a lateral turning prevention control or a traction control, the brake ECU is configured to drive the motor 60, thereby rotating the rotary pumps 19, 39. Accordingly, in the pump body 100, the rotary pumps 19, 39 basically suction the brake fluid via the suction pipe lines 90a, 92a and discharge the brake fluid via the discharge pipe lines 91, 93. In addition, the rotary pumps suction and discharge the brake fluid in the reservoirs 20, 40 to supply it to the pipe lines A, E.

For this reason, when the M/C pressure is not generated in the M/C 13 as in the lateral turning prevention control or the traction control, the brake fluid is suctioned by the rotary pumps 19, 39 via the pipe lines D, H and is supplied to the pipe lines A, E to increase the pressure of the W/C 14, 15, 34, 35. Further, when an excessive W/C pressure which causes lock trend is generated in the W/C as in the ABS control, since the brake fluid which is relieved to the reservoirs 20, 40 through the pipe lines B, F is suctioned by the rotary pumps 19, 39, the reservoir 20, 40 is not filled with the brake fluid. Accordingly, the W/C pressure is increased or decreased for obtaining a suitable slippage rate. In this way, the brake apparatus for a vehicle and the rotary pumps 19, 39 are actuated.

Upon performing such an operation, this embodiment employs the sealing member 130 having the configuration mentioned above and thus the effect as follows can be achieved. Hereinafter, reference is made to FIG. 6, which is a partial magnified sectional view of the resin ring 131 and the rubber cap 132 for illustrating a force applied on the rubber cap 132 after being mounted on the rotary pump apparatus.

Since the sealing member 130 is fitted into a space between the third cylinder 71c and the driving shaft 54, basically, both chambers partitioned by the sealing member 130 between the third cylinder 71c and the driving shaft 54 are maintained in a liquid-tight state by the sealing member 130. For example, even if the pumps are driven and thus the pressure of a first chamber on one side (rotary pump 39 side) of the lip-shaped portion 132b in an axial direction is higher than the pressure of a second chamber on opposite side (oil seal 140 side) of the lip-shaped portion 132b in the axial direction, the pressure of the first chamber is applied on the lip-shaped portion 132b. Accordingly, it is possible to prevent the brake fluid from moving from the first chamber to the second chamber while maintaining the pressure difference between the first chamber and the second chamber.

Figure 6:
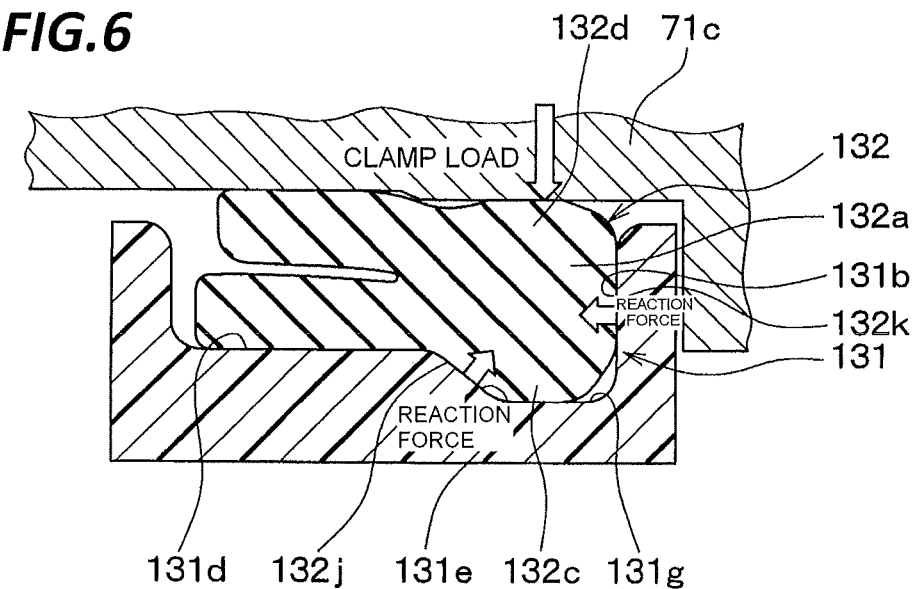
FIG. 6 is a partial magnified sectional view of the resin ring 131 and the rubber cap 132 for illustrating a force applied on the rubber cap 132 after being mounted on the rotary pump apparatus.

At this time, due to the brake hydraulic pressure in the first chamber, an urging force which urges the rubber cap 132 toward the second chamber is generated. However, even in this case, a force is applied on the base portion 132a of the rubber cap 132 so that the axial movement of the rubber cap 132 can be restricted. Specifically, as illustrated in FIG. 6, when the sealing member 130 is fitted into a space between the third cylinder 71c and the driving shaft 54, the base portion 132a is subjected to a clamp load applied from the third cylinder 71c radially inwards and an elastic reaction force applied from the wall surface 131b and the grooved inclined surface 131e. Accordingly, the portion of the base portion 132a of the rubber cap 132 which contacts the wall surface 131b is constituted as a restricting surface (second restricting surface) 132k and this restricting surface can prevent the rubber cap 132 from moving rearward (toward the motor 60) in the insertion direction due to the brake hydraulic pressure of the rotary pump 39 side.

Further, there may be a case that if the brake fluid is leaked from the first chamber to the second chamber to be collected in the second chamber, an urging force due to the hydraulic pressure in the second chamber can cause the rubber cap 132 to be urged toward the first chamber can be occurred. For example, there is a case that the pressure equilibrium state between the first chamber and the second chamber is achieved during the operation of the pump and this pressure equilibrium state is changed due to a shut-off of the pump, so that the pressure of the second chamber is higher than the pressure of the first chamber. In this case, an urging force is occurred which urges the rubber cap 132 against the first chamber side.

However, even in this case, a portion of the base portion 132a of the rubber cap 132 which contacts the grooved inclined surface 131e as illustrated in FIG. 6 is constituted as a restricting surface (first restricting surface) and a reaction force applied on the restricting surface can restrict the rubber cap 132 to move forward (toward the rotary pump 39 side) in the insertion direction.

Even in this case, it is noted that since the slit 132e is provided on the annular projection 132d, when the pressure of the second chamber becomes higher than the pressure of the first chamber, the brake fluid can flow back to the first chamber via the slit 132e. On this account, it is possible to prevent the brake fluid from being leaked from the oil seal 140. At this time, the brake fluid in the second chamber is caused to flow back to the first chamber via the lip 132f, but the lip 132f can be easily fallen down radially inwards by the pressure of the second chamber so that the brake fluid can be relieved. As a result, even if the lip 132f is provided, the brake fluid in the second chamber can easily flow back to the first chamber.

As explained above, in the above embodiment, the rubber cap of the sealing member 130 is composed of the base portion 132a and the lip-shaped portion 132b, and the base portion is fixed in a predetermined position between the resin ring 132 and the third cylinder 71c while the flow of the brake fluid from the first chamber to the second chamber is restricted by the lip-shaped portion 132b.

Accordingly, it is possible to restrict the axial movement of the sealing member 130 disposed between the driving shaft 54 which corresponds to the shaft and the third cylinder 71c which constitutes a part of the case. By doing so, a pumping action due to the axial movement of the sealing member 130 relative to the driving shaft 54 can be prevented. As a result, it is possible to prevent the pressure rising of the second chamber between the sealing member 130 and the oil seal 140 and to avoid a pressure leakage or the deterioration of the sealing ability due to such a pressure rising.

Further, in this way, since the restricting surfaces 132*j*, 132*k* for restricting the axial movement of the resin ring are provided on the base portion 132*a* rather than the lip-shaped portion 132*b*, the operation of the lip 132*f*, 132*g* is hardly hindered, as compared to an aspect where the restricting surfaces are provided on the lip-shaped portion 132*b*. Accordingly, in the present embodiment, it is possible to stably relieve the brake fluid in the second chamber side toward the first chamber. In other words, it is possible to stably relieve the pressure in the second chamber toward the first chamber via the lip-shaped portion 132*b*.

Further, in this configuration in which the holding portion 132*c* has an arc-shaped section, even if the axial dimension of the accommodation portion 131*g* in the resin ring 131 is irregular, the holding portion 132*c* can be securely fitted into the accommodation portion 131*g*. Accordingly, regardless of the irregular dimension of the holding portion, it is possible to achieve the above effect.

Second Embodiment

The second embodiment of the present invention will be described. This second embodiment is a modification for the sealing member 130 of the first embodiment. Accordingly, the second embodiment has a configuration the same as that of the first embodiment except for the sealing member and thus only the difference points will be described.

Figure 7:
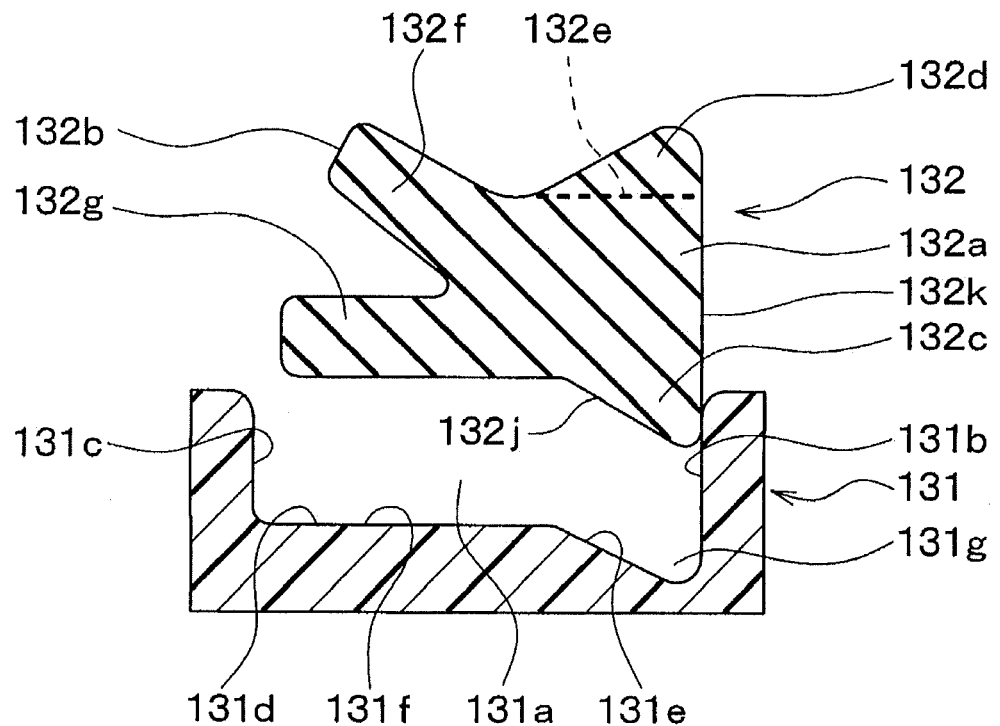
FIG. 7 is a partial magnified view illustrating a sealing member 130 according to a second embodiment of the present invention.

FIG. 7 is a partial magnified view illustrating a sealing member 130 according to a second embodiment of the present invention. In FIG. 7, the resin ring 131 and the rubber cap 132 are separated from each other.

As illustrated in FIG. 7, in this embodiment, the holding portion 132*c* provided in the base portion 132*a* has not an arc-shaped section but a triangle-shaped section. Further, the accommodation portion 131*g* formed on the resin ring 131 has a triangle-shaped section corresponding to the sectional-shape of the holding portion 132*c*.

As such, even in a case that the holding portion 132*c* has a triangle-shaped section, the annular projection 132*d* is pressed by the third cylinder 71*c*, so that the holding portion 132*c* is pushed into the groove 131*g* formed on a periphery of a resin ring body. Further, the wall surface 131*b* or the grooved inclined surface 131*e* of the resin ring 131 serves to restrict the axial movement of the base portion 131*a*. That is, since the surface 132*j* of the holding portion 132*c* which contacts the grooved inclined surface 131*e* or the surface 132*k* of the holding portion 132*c* which contacts the wall surface 131*b* is constituted as a restricting surface, the axial movement of the base portion 132 can be restricted.

In this way, even in a case that the holding portion 132*c* has a triangle-shaped section, it is possible to achieve the effect same as that of the first embodiment. Further, in this configuration in which the holding portion 132*c* has a triangle-shaped section, even if the axial dimension of the accommodation portion 131*g* in the resin ring 131 is irregular, the holding portion 132*c* can be securely fitted into the accommodation portion 131*g*. Accordingly, regardless of the irregular dimension of the holding portion, it is possible to achieve the above effect.

Figure 8:
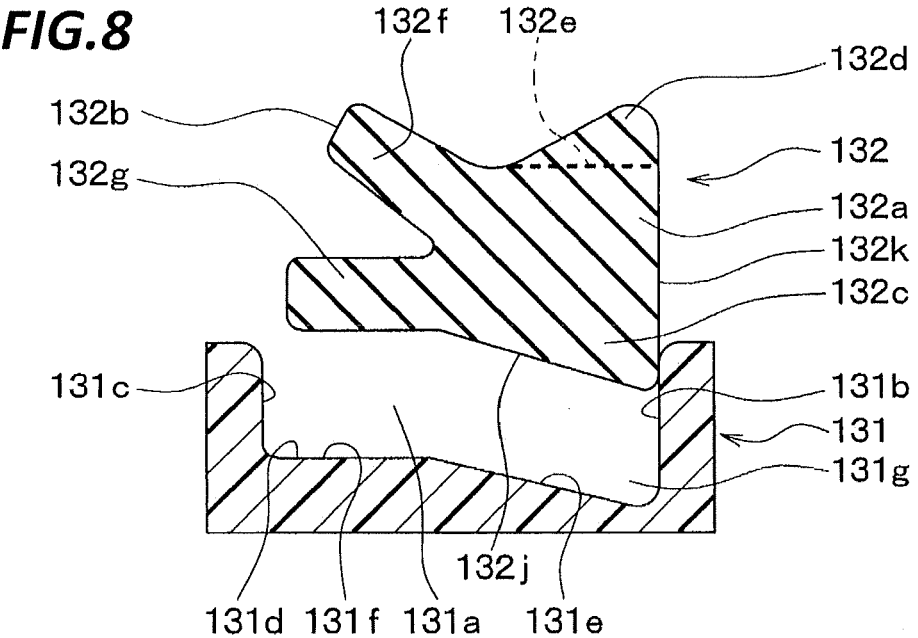
FIG. 8 is a partial magnified view illustrating a sealing member 130 according to a modification of the second embodiment.

Meanwhile, although the holding portion 132 is formed only a part of the base portion 132*a* which contacts the bottom surface 131*d* of the resin ring 131 in FIG. 7, it is also possible that the formation region of the holding portion 132*c* is increased and the holding portion 132*c* is formed over entire region of the base portion 132*a* which contacts the bottom surface 131*d* of the resin ring 131, as illustrated in FIG. 8.

Third Embodiment

The third embodiment of the present invention will be described. This third embodiment is a modification for the sealing member 130 of the first embodiment. Accordingly, the third embodiment has a configuration the same as that of the first embodiment except for the sealing member and thus only the difference points will be described.

Figure 9:
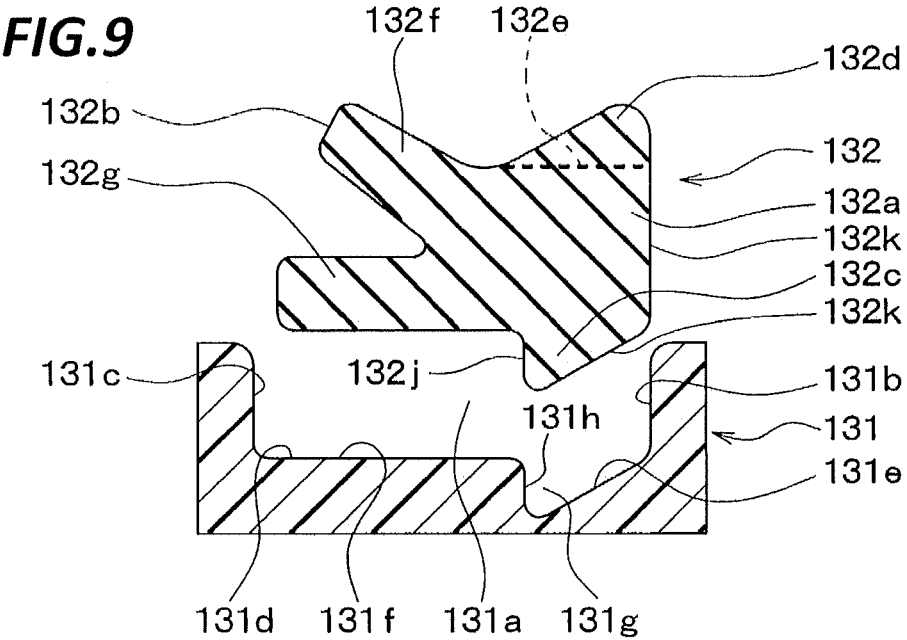
FIG. 9 is a partial magnified view illustrating a sealing member 130 according to a third embodiment of the present invention.

FIG. 9 is a partial magnified view illustrating a sealing member 130 according to a second embodiment of the present invention. In FIG. 9, the resin ring 131 and the rubber cap 132 are separated from each other.

As illustrated in FIG. 9, in this embodiment, the holding portion 132*c* provided in the base portion 132*a* has a triangle-shaped section, as in the second embodiment, but a surface of the holding portion 132*c* toward the oil seal 140 is constituted as a tapered surface. Further, the grooved inclined surface 131*e* of the accommodation portion 131*g* formed on the resin ring 132 is formed continuous with the wall surface 131*b* of the bottom surface 131*d* to correspond to the tapered surface of the holding portion 132*c*.

As such, even in a case that the holding portion 132*c* has a triangle-shaped section, the annular projection 132*d* is pressed by the third cylinder 71*c*, so that the holding portion 132*c* is pushed into the groove 131*g* formed on a periphery of a resin ring body. Further, the wall surface 131*b* or the grooved inclined surface 131*e* of the resin ring 131 or the stepped portion between the grooved inclined surface 131*e* and the lip accommodation portion 131*f* serves to restrict the axial movement of the base portion 131*a*. That is, since the surface 132*j* of the holding portion 132*c* which contacts the stepped portion 131*h* or the surface 132*k* of the holding portion 132*c* which contacts the grooved inclined surface 131*e* or the wall surface 131*b* is constituted as a restricting surface, the axial movement of the base portion 132 can be restricted.

Consequently, even in a case that the holding portion 132*c* has a triangle-shaped section, it is possible to achieve the effect same as that of the first embodiment.

Fourth Embodiment

The fourth embodiment of the present invention will be described. This fourth embodiment is a modification for the sealing member 130 of the third embodiment. Accordingly, the fourth embodiment has a configuration the same as that of the third embodiment except for the sealing member and thus only the difference points will be described.

Figure 10:
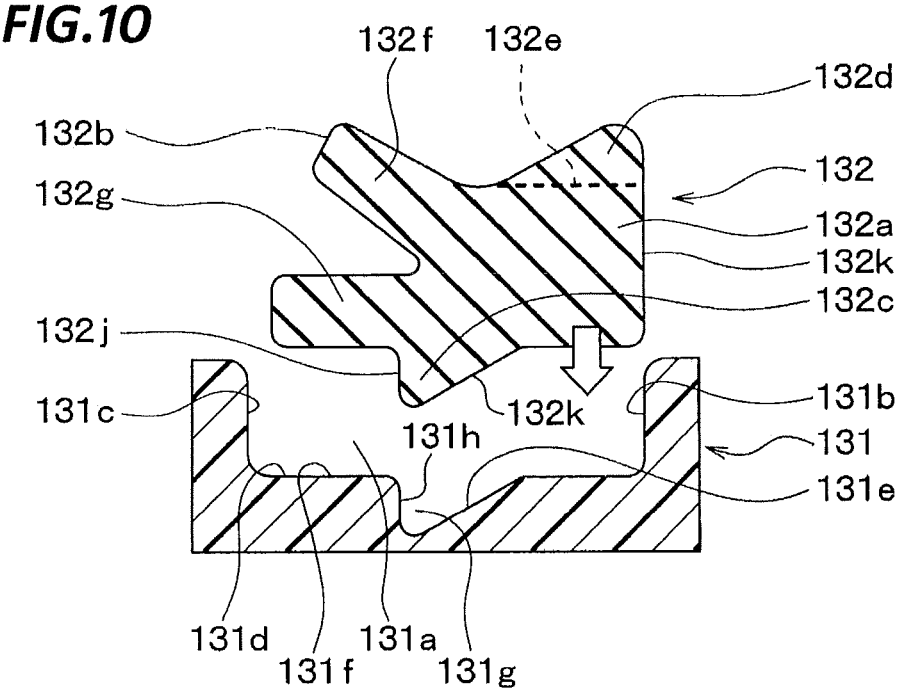
FIG. 10 is a partial magnified view illustrating a sealing member 130 according to a fourth embodiment of the present invention.

FIG. 10 is a partial magnified view illustrating a sealing member 130 according to a second embodiment of the present invention. In FIG. 10, the resin ring 131 and the rubber cap 132 are separated from each other.

As illustrated in FIG. 10, in this embodiment, the holding portion 132*c* provided in the base portion 132*a* has a triangle-shaped section, as in the third embodiment, but the formation position of the holding portion is different from the third embodiment and offset from the annular projection 132 in the axial direction. Specifically, in this embodiment, the holding portion 132c is configured to be shifted toward the rotary pump 39 than the annular projection 132d in the axial direction.

In this way, when the formation positions of the holding portion 132c and the annular projection 132d are offset from each other, the annular projection 132d is squashed by the third cylinder 71c to generate a clamp load and this clamp load acts on a region different from the formation position of the holding portion 132c. Specifically, the clamp load acts on a region of the bottom surface 131d of the resin ring 131 different from the accommodation portion 131g and used as a force which presses the resin ring 131 toward the driving shaft 54 (see, arrow in FIG. 10). That is, the rubber cap 131 is divided into a portion which restricts the axial movement of the base portion 132a and a portion which presses the resin ring 131 against the driving shaft 54. Accordingly, it is possible to improve a surface pressure by which the base portion 131a is pressed against the resin ring 131.

Fifth Embodiment

The fifth embodiment of the present invention will be described. This fourth embodiment is a modification for the sealing member 130 of the second embodiment. Accordingly, the fifth embodiment has a configuration the same as that of the second embodiment except for the sealing member and thus only the difference points will be described.

Figure 11:
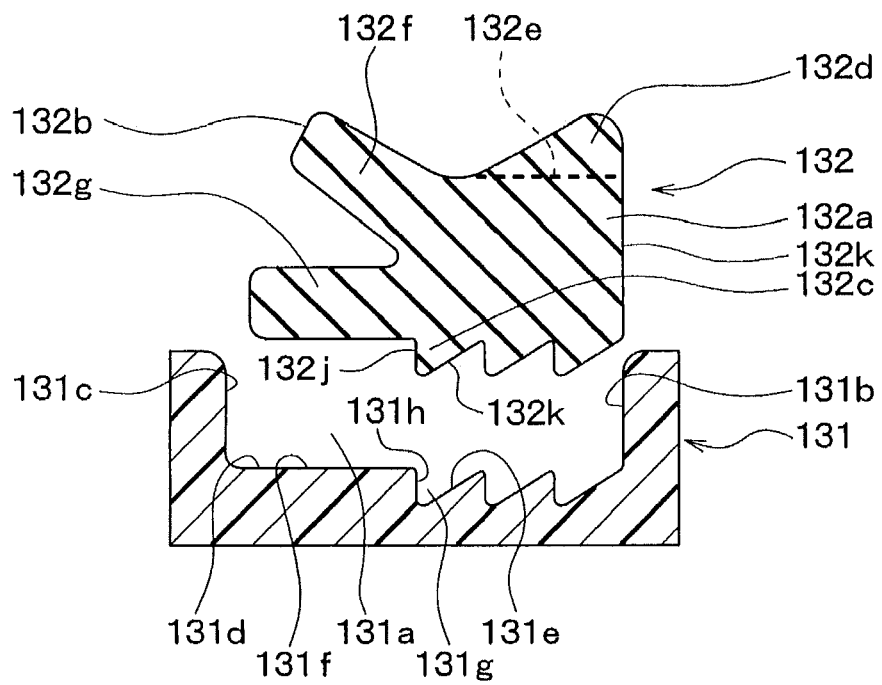
FIG. 11 is a partial magnified view illustrating a sealing member 130 according to a fifth embodiment of the present invention.

FIG. 11 is a partial magnified view illustrating a sealing member 130 according to a second embodiment of the present invention. In FIG. 11, the resin ring 131 and the rubber cap 132 are separated from each other.

As illustrated in FIG. 11, in this embodiment, the holding portion 132c provided in the base portion 132a has a triangle-shaped section and is continuously arranged to form a saw-toothed section. Further, the accommodation portion 131g formed on the resin ring 131 has a saw-toothed section corresponding to the saw-toothed section of the holding portion 132c.

As such, even if the holding portion 132c has a saw-toothed shape (that is, a shape in which many holding portions 132c illustrated in FIG. 9 or FIG. 10 are arranged in parallel), the holding portion 132c can be caught into the saw-toothed groove of the accommodation portion 131g to restrict the axial movement of the base portion 132a. That is, since each surface 132j of the holding portion 132c which contacts each stepped portion 131h of the resin ring 131 or each surface 132k of the holding portion 132c which contacts each grooved inclined surface 131e or the wall surface 131b is constituted as a restricting surface, the axial movement of the base portion 132 can be restricted. As a result, it is possible to achieve the effect same as that of the first embodiment.

Sixth Embodiment

The sixth embodiment of the present invention will be described. This sixth embodiment is a modification for the sealing member 130 of the first embodiment. Accordingly, the sixth embodiment has a configuration the same as that of the first embodiment except for the sealing member and thus only the difference points will be described.

Figure 12:
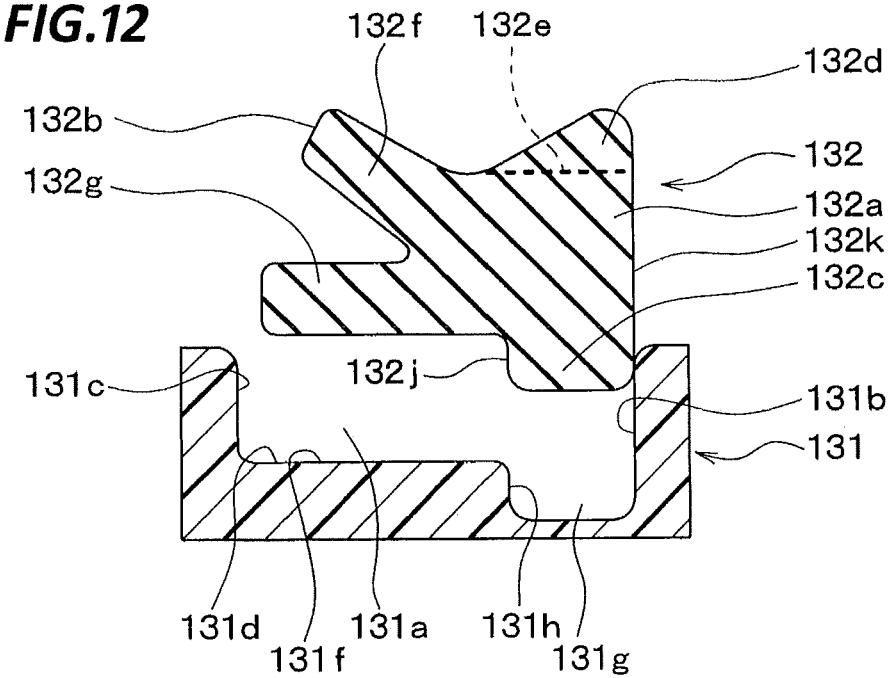
FIG. 12 is a partial magnified view illustrating a sealing member 130 according to a sixth embodiment of the present invention.

FIG. 12 is a partial magnified view illustrating a sealing member 130 according to a second embodiment of the present invention. In FIG. 12, the resin ring 131 and the rubber cap 132 are separated from each other.

As illustrated in FIG. 12, in this embodiment, the holding portion 132c provided in the base portion 132a has not an arc-shaped section but a rectangular-shaped section. Further, the accommodation portion 131g formed on the resin ring 131 has a rectangular-shaped section corresponding to the sectional-shape of the holding portion 132c. In this case, it is noted that the axial width of the holding portion 132c is set smaller than the axial width of the accommodation portion 131g and the projection amount of the holding portion 132c in a radial direction is set deeper than the projection amount of the accommodation portion 131g.

In this configuration, since the annular projection 132d is squashed by the third cylinder 71c to generate a clamp load, the holding portion 132c is also squashed in the accommodation portion 131g. Accordingly, the holding portion 132c is brought into contact with the inner wall surface of the accommodation portion 131g. By doing so, it is possible to restrict the axial movement of the base portion 132a. That is, by constituting each of the surface 132j, 132k of the holding portion 132c which contacts each of the side wall surface 131h, 131b of the accommodation portion 131g as a restricting surface, it is possible to restrict the axial movement of the base portion 132a.

As such, even in this configuration in which the holding portion 132c is squashed in the accommodation portion 131g so that the holding portion 132c contacts the inner wall surface of the accommodation portion 131g, it is possible to achieve the effect same as that of the first embodiment.

Meanwhile, as in this embodiment, when the holding portion 132c has a rectangular-shaped section, the axial dimensions of the holding portion 132c and the accommodation portion 131g may be equal to each other. However, when the axial dimension of the holding portion 132c is larger than the accommodation portion 131g due to irregularities in dimensions, it is also considered that the holding portion 132c is not fitted into the accommodation portion 131g. Accordingly, it is preferred that the axial width of the holding portion 132c is set smaller than the axial width of the accommodation portion 131g.

Reference Embodiment

A reference embodiment similar to the present invention will be described. This reference embodiment is a modification for the sealing member 130 of the first embodiment. Accordingly, the reference embodiment has a configuration the same as that of the first embodiment except for the sealing member and thus only the difference points will be described.

Figure 13:
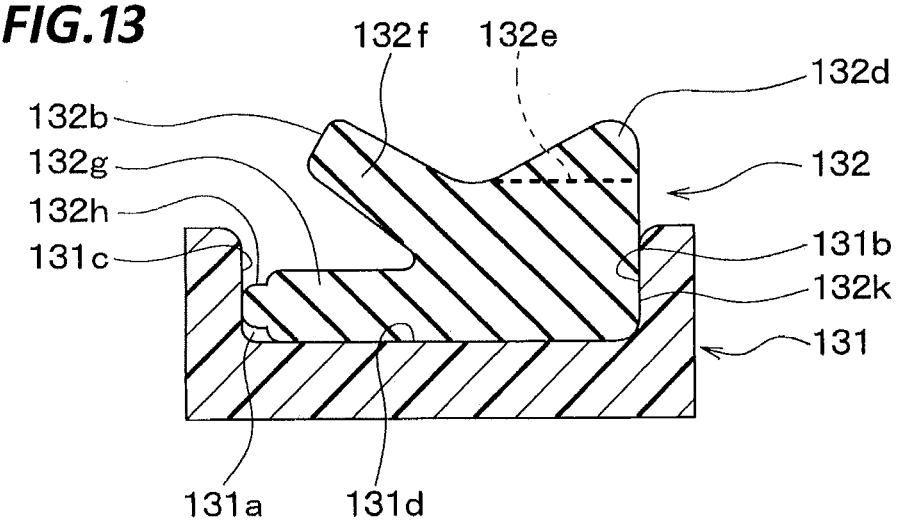
FIG. 13 is a partial magnified view illustrating a sealing member 130 according to a seventh embodiment of the present invention.

FIG. 13 is a partial magnified view illustrating a sealing member 130 according to a second embodiment of the present invention. In FIG. 13, the resin ring 131 and the rubber cap 132 are separated from each other.

As illustrated in FIG. 13, the reference embodiment employs a configuration that the holding portion 132c mentioned in the first embodiment is not provided at the base portion 132a. Further, for example, a projection 132h having a semi-circular section is provided at a leading end of the lip 132g in the lip-shaped portion 132b. Accordingly, as the rubber cap 132 is fitted into the resin ring 131, the projection 132 is squashed. In this way, the rubber cap 132 is fixed in the cap accommodation groove 131a of the resin ring 131.

In this configuration, since the rubber cap 132 is fixed while being interposed between both wall surfaces 131b, 131c of the resin ring 131, it is possible to restrict the axial movement of the rubber cap 132. Even in this configuration, it is possible to achieve the effect same as that of the first embodiment.

Another Embodiment

Although the holding portion 132c has an arc-shaped section, a triangle-shaped section or a rectangular-shaped section in the above embodiments, these shapes are just illustrative. The holding portion may have another polygonal-shaped section other than the above section.

Further, in the above embodiments, the base portion 132a is pressed toward the resin ring 131 by the annular projection 132 and the flow back of the brake fluid from the second chamber to the first chamber is possible. However, this configuration is just illustrative and a configuration may be employed in which a plurality of projections are disposed in a circumferential direction and the flow back of the brake fluid from the first chamber to the second chamber via a space between the projections can be performed.

Further, in the above embodiments, a portion of the base portion 132a which contacts the wall surface 131b of the resin ring 131 or the holding portion 132c serves as the restricting surface so that the axial movement of the base portion 132a relative to the resin ring 131 in both directions is restricted. For example, in the first embodiment, a part of the holding portion 132c which contacts the tapered surface 131e of the resin ring 131 serves as the first restricting surface 132j for restricting the axial movement of the base portion 132a in one direction and a part of the base portion 132a which contacts the wall surface 131b serves as the second restricting surface 132k for restricting the axial movement of the base portion 132a in other direction. By these configurations, the restricting operation is performed. That is, a part of the base portion 132a which serves as the restricting surface is a region which contacts the resin ring 131. However, a part of the base portion 132a which serves as the restricting surface is not limited to a region which contacts the resin ring 131. That is, a portion which projects from the base portion 132a toward the third cylinder 71c may be provided as the holding portion and a concave portion corresponding to the holding portion may be provided in the inner peripheral surface of the third cylinder 71c which corresponds to the part of the case. In addition, the holding portion is fitted into the concave portion, so that the axial movement of the base portion 132a relative to the resin ring 131 in both directions can be restricted. In this case, the portion of the base portion 132a which contacts the third cylinder 71 is constituted as a restricting surface.

In the above embodiments, as an example of the sealing apparatus of the present invention, the sealing member 130 for sealing between the driving shaft 54 and the third cylinder 71c of the rotary pump apparatus incorporated in the brake apparatus has been explained. However, the sealing member is only illustrative and the present invention is also applicable to another sealing apparatus for sealing between the shaft and the case. That is, when the pressure of the first chamber which is one side of the lip-shaped portion 132b in an axial direction is lower than the pressure of the second chamber which is the other side thereof, the lip 132f of the lip-shaped portion 132b can be spaced apart from the inner peripheral surface of the case so that the pressure in the second chamber can be relieved to the first chamber. Also, when the movement of the base portion 132a relative to the resin ring 131 in both axial directions is restricted, the present invention is also applicable to a sealing apparatus for sealing another fluid other than the brake fluid.

What is claimed is:

1. A sealing apparatus comprising:
   a case having a hollow portion;
   a shaft passing through the hollow portion; and
   a sealing member configured to seal between the case and the shaft and divide the hollow portion into a first chamber and a second chamber, the sealing member including a resin ring and a ring-shaped rubber cap fitted on an outer periphery of the resin ring,
   wherein the rubber cap includes a ring-shaped base portion and a lip portion extending from an end of the base portion in an axial direction toward the first chamber;
   wherein the lip portion includes a first lip contacting the resin ring and a second lip configured to contact an inner peripheral surface of the case,
   wherein when a pressure of the first chamber is lower than a pressure of the second chamber, the second lip is separated from the inner peripheral surface of the case to relieve the pressure of the second chamber to the first chamber,
   wherein the base portion includes a first restricting surface for restricting the base portion from moving with respect to the resin ring toward the first chamber, and a second surface for restricting the base portion from moving with respect to the resin ring toward the second chamber,
   wherein the base portion includes a projection squashed by the inner peripheral surface of the case to generate a pressing force which presses the resin ring to the shaft when the seal member is disposed between the case and the shaft,
   wherein a slit axially extends through the projection so that the first chamber and the second chamber are in fluid communication with each other via the axially extending slit when the pressure of the first chamber is lower than the pressure of the second chamber, and
   wherein the resin ring has a wall extending in a radial direction of the shaft, a radially outermost surface of the wall being higher in the radial direction than every topmost portion of the first lip.

2. The sealing apparatus according to claim 1, wherein the first restricting surface is formed at a part of the base portion which projects radially inwardly from a base end of the first lip, or a part of the base portion which projects radially outwardly from a base end of the second lip.

3. The sealing apparatus according to claim 1, wherein
   the resin ring includes an abutment surface configured to contact at least one of the first and second restricting surface to restrict the rubber cap from moving with respect to the resin ring in the axial direction, and
   the abutment surface is inclined in the axial direction and in a radial direction of the resin ring.

4. The sealing apparatus according to claim 1, wherein
   the base portion includes a holding portion projecting radially inwardly, the holding portion having an arc-shaped section passing through an axis of the shaft,
   the resin ring includes an accommodating groove to which the rubber cap is fitted and an accommodating portion accommodating the holding portion, and
   the first restricting surface is formed by a part of the holding portion which contacts an inner wall surface of the accommodating portion.

5. The sealing apparatus according to claim 1, wherein the slit is radially inwardly recessed from an outer surface of the projection.

6. The sealing apparatus according to claim 1, wherein the first restricting surface is formed at a part of the base portion which projects radially inwardly from a base end of the first lip, or a part of the base portion which projects radially outwardly from a base end of the second lip.

7. The sealing apparatus according to claim 1, wherein
   the resin ring includes an abutment surface configured to contact at least one of the first and second restricting surface to restrict the rubber cap from moving with respect to the resin ring in the axial direction, and
   the abutment surface is inclined in the axial direction and in a radial direction of the resin ring.

8. The sealing apparatus according to claim 1, wherein
the base portion includes a holding portion projecting radially inwardly, the holding portion having an arc-shaped section passing through an axis of the shaft,
the resin ring includes an accommodating groove to which the rubber cap is fitted and an accommodating portion accommodating the holding portion, and
the first restricting surface is formed by a part of the holding portion which contacts an inner wall surface of the accommodating portion.

9. The sealing apparatus according to claim 1, wherein the slit is radially inwardly recessed from an outer surface of the projection.

10. A sealing apparatus comprising:
a case having a hollow portion;
a shaft passing through the hollow portion; and
a sealing member configured to seal between the case and the shaft and divide the hollow portion into a first chamber and a second chamber, the sealing member including a resin ring and a ring-shaped rubber cap fitted on an outer periphery of the resin ring,
wherein the rubber cap includes a ring-shaped base portion and a lip portion extending from an end of the base portion in an axial direction toward the first chamber;
wherein the lip portion includes a first lip contacting the resin ring and a second lip configured to contact an inner peripheral surface of the case,
wherein when a pressure of the first chamber is lower than a pressure of the second chamber, the second lip is separated from the inner peripheral surface of the case to relieve the pressure of the second chamber to the first chamber,
wherein the base portion includes a first restricting surface for restricting the base portion from moving with respect to the resin ring toward the first chamber, and a second surface for restricting the base portion from moving with respect to the resin ring toward the second chamber,
wherein the base portion includes a projection squashed by the inner peripheral surface of the case to generate a pressing force which presses the resin ring to the shaft when the seal member is disposed between the case and the shaft,
wherein a slit axially extends through the projection so that the first chamber and the second chamber are in fluid communication with each other via the axially extending slit when the pressure of the first chamber is lower than the pressure of the second chamber, and
wherein the resin ring has spaced apart first and second walls extending in a radial direction of the shaft, the base portion has opposed first and second surfaces, the first surface faces the first wall while being in contact with the first wall, and the second surface faces the second wall while being out of contact with the second wall.

* * * * *